May 20, 1941.    A. B. SCHLATTNER    2,242,924
APPARATUS FOR CURVING PRINTING PLATES
Filed July 13, 1938
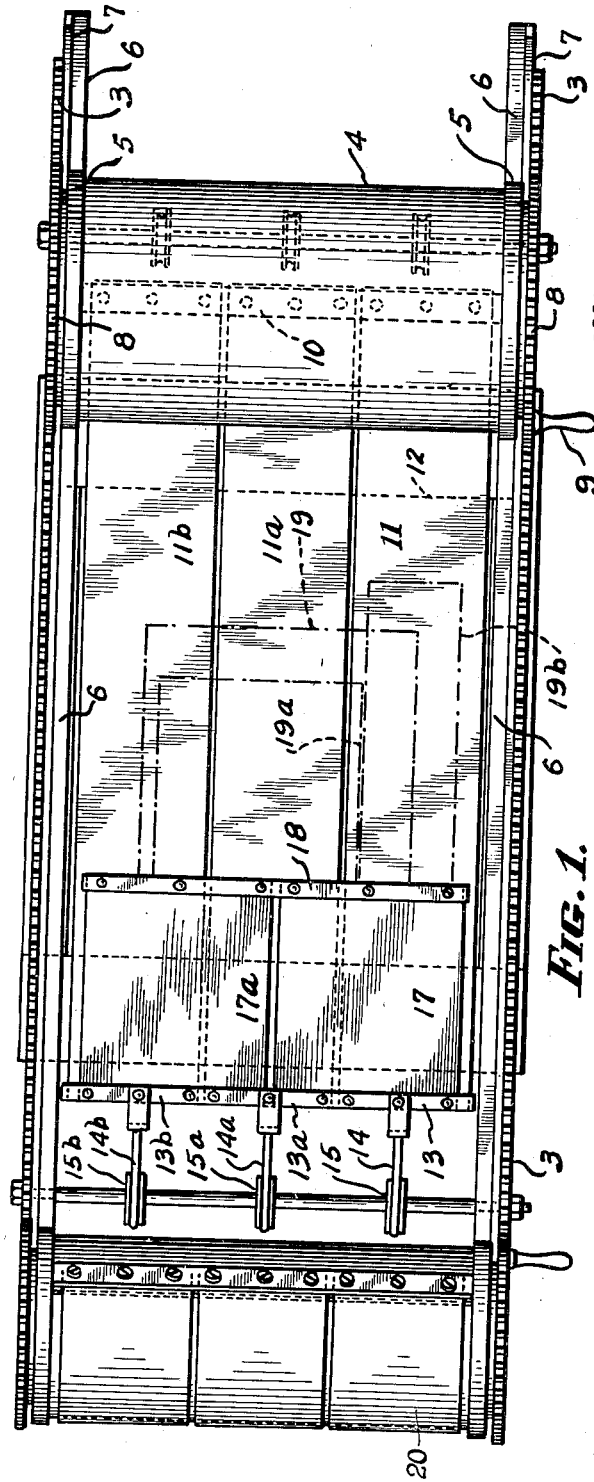
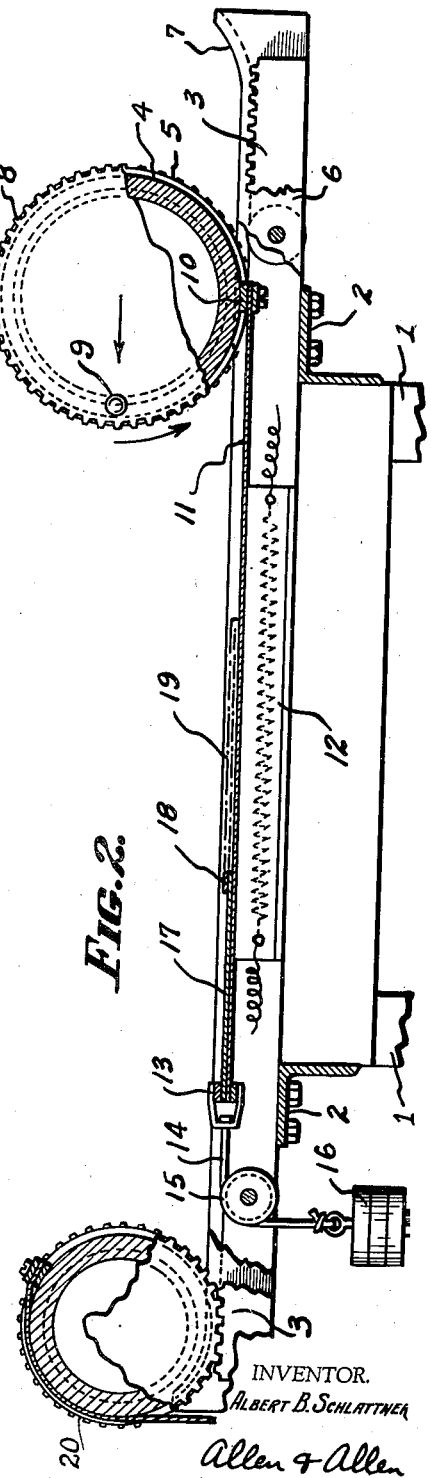
INVENTOR.
ALBERT B. SCHLATTNER
Allen & Allen
ATTORNEYS.

Patented May 20, 1941

2,242,924

UNITED STATES PATENT OFFICE 2,242,924

APPARATUS FOR CURVING PRINTING PLATES

Albert B. Schlattner, Cincinnati, Ohio, assignor to The Printing Machinery Corporation, Cincinnati, Ohio, a corporation of Ohio Application July 13, 1938, Serial No. 219,004

9 Claims. (Cl. 153—40)

My invention relates to apparatus for curving printing plates where it is desirable that the spacing between the printing lines or pictorial representations of the printing plate when curved shall be the same as said spacing when said plate was in the flat, and is especially useful for curving printing plates employed in multi-colored printing, wherein it is necessary to register the impressions of different printing plates employed for printing different colors. The invention is also applicable in other relations where maintenance of space relationship on printing plates during curving of the plates is to be effected.

In the manufacture of printing plates, particularly where electro-types are used, it is customary to prepare the plates in the flat. The plates then have a backing of soft metal such as type metal, applied to the back of the shell or printing surface, which is usually copper but may be any suitable metal. Since most printing is now done on presses having cylindrical printing cylinders, the next step is to curve the flat printing plates so that they will conform to the desired arc of curvature of the particular press on which they are to be used, and also so that the spacing of the parts of the plate which receive the ink remains the same after curving as when the plates are in the flat.

In the art it is old, as shown in the Claybourn Patent No. 1,372,064, to provide a pair of semicylindrical mold sections to which the ends of a flexible band are secured and to curve a printing plate, the backing of which has been softened by heat, by mechanically rotating the semicylindrical mold sections so that they come together forming a cylinder, the plate to be curved being held between the periphery of the mold sections and the inner surface of the flexible band, thereby curving the printing surface of the plate to a curvature dependent on the arc of curvature of the inner surface of the flexible band.

Such apparatus while it is operable, is subject to many disadvantages in the event that the setting of the cylindrical mold sections is not very carefully controlled. If the mold sections do not come together in a perfect cylinder and one section is a little late in its movement with respect to the cooperating section, an imperfect plate results. Further the flexible band, which is exposed to the same heat which softens the backing, is inclined to warp and buckle. Generally speaking of the difficulties with the use of the apparatus of the Claybourn patent referred to, they may be summed up in a general criticism that the apparatus lacks a means for enforcing exact registry of the plate with the curving apparatus.

It is an object of my invention to provide apparatus for curving printing plates in which exact registry of the plate is enforced during the curving operation.

A further object is the provision of mechanism in which whole cylindrical molds are employed which do not depend on movement to registry of the parts of a composite cylindrical mold and which may conveniently be replaced in the mechanism so that plates may be curved to different arcs of curvature by replacement in the mechanism of cylindrical molds having a different diameter while at the same time employing all the other mechanism necessary for carrying out the plate curving operation with replacement or difficult adjustment.

Another object of my invention is the provision of a plurality of flexible bands, each of which during the plate backing softening operation are independently held under such tension as will tend to prevent buckling and permit different expansion of each of the flexible bands.

Further objects and advantages will be described in connection with the following explanation of my invention, as shown in the accompanying drawing, which illustrate a mechanical embodiment sufficient to enable one skilled in the art to utilize the same with such substitution of equivalent elements as may meet his particular requirements.

Referring to the drawing:

Figure 1 is a plan view showing a preferred type of printing plate curving mechanism.

Fig. 2 is a side elevation with parts in section showing the apparatus shown in plan view in Fig. 1.

The mechanism is provided with supporting legs such as are indicated at 1, which support frame members 2, which are mounted in a rectangular formation to form a table. At the side edges of the table there are provided rack members 3 having the teeth thereof on the upper surface of the racks.

In the figures I have shown two core cylinders which for purposes of illustration may be considered to be one for curving a plate to fit a twelve inch printing cylinder, and the other for curving a plate to fit a ten inch cylinder. In the illustration the mold cylinder shown at the left of the figures is in inoperative position, while the cylindrical core shown to the right is in operative position. I will describe first the operation of the cylindrical core which is in operative position.

The cylindrical core has a peripheral surface 4 extending between annular rim members 5, the periphery 4 being offset inwardly or of a sufficiently lesser diameter as to enclose the printing plate to be curved. For example, if the thickness of the printing plate to be curved is $\frac{1}{16}$ inch, the difference in the diameter of the portion 4 of the cylindrical core is $\frac{3}{8}$ inch less than the diameter of the annular rim members 5, thereby providing a recess portion which receives the printing plate of $\frac{1}{16}$ of an inch.

The table has mounted thereon bearers 6. The bearers have flanged outer edges 7, which receive the outer surfaces of the annular rim members 5 snugly, so that with the rolling movement of the cylindrical core member on the bearers, there will be no tendency to disinclination of the cylindrical cores on the bearers. Gear wheels 8 are secured at the ends of the cylindrical core, the teeth of which mesh with the teeth of the racks.

A handle 9 is provided which will permit the cylindrical core to be rotated during the plate curving operation.

Secured to the periphery of the core cylinder I have illustrated a clamp 10 having an inner plate corresponding in thickness to the recess in the cylinder, and an outer clamping bar which secures the end of the flexible bands 11, 11a and 11b.

The flexible bands extend from the clamping bar across a heating unit 12, and are secured in clamps 13, 13a, 13b.

From the clamps 13, 13a, 13b, cables 14, 14a and 14b extend over pulleys 15, 15a and 15b, and weights as indicated at 16 are secured to the cables, and these weights maintain the flexible plates 11, 11a and 11b in taut condition.

The means for tensioning the flexible bands 11, 11a and 11b, which I have illustrated may instead of weights be springs or other means of pulling the free ends of the flexible bands to maintain them under a constant tension.

Secured to the clamps 13, 13a and 13b, I have shown the flexible bands 17, 17a, and to the free ends of these flexible bands I have shown the stop plate 18. The use of the stop plate 18 forms an important feature of my invention inasmuch as it provides a definitely controlled means of preventing distortion of the printing plate during the curving operation, the stop bar 18 holds the printing plate in alignment with the cylinder, and keeps it from sliding along the flat bed during the curving process.

If the plate is not held in alignment with the axis of the cylinder it will not curve squarely with the printing image.

If it slides along the bed during curving, it will elongate, as dough in bread making. It is essential for the purposes of my invention to insure a non-stretched plate in which the distance between registering points while the plate is in the flat will remain the same after the plate is curved.

Where the printing plate to be curved extends only slightly beyond the edge of the center band as illustrated by the plate shown in dotted lines at 19a, I employ a backing strip such as a piece of brake lining having substantially the same thickness of the plate to be curved to prevent squeezing out of the metal in the plate along this edge. Thus, I have indicated at 19b such a filler strip as is employed with the plate 19a.

The heater 12 is turned on after the plate to be curved such as is indicated in dotted lines at 19, is positioned over the heater. During the heating the flexible bands 11, 11a and 11b, expand differently, but due to the tensioning of the ends of the bands opposite the clamp 10, this expansion does not cause buckling.

The band at the center receives more heat than at any other point, and therefore tends to expand unevenly and to buckle. It is a feature of the invention that instead of providing a single band which is subject to uneven expansion and buckling, a plurality of narrow bands are provided which are independently mounted so that each can expand under the influence of the heat to which it is subjected, and each band is so mounted that it cannot buckle and thus the uneven expansion of the three bands is rendered unobjectionable.

The uneven expansion of the flexible bands further does not displace the stop or registry bar 18.

To perform a curving operation the printing plate is placed in the position indicated at 19, and the heat is turned on the heater 12. As soon as the backing metal has softened, the handle 9 is employed to rotate the cylindrical mold in a counter-clockwise direction. This causes the cylindrical core to move to the left as illustrated.

The printing plate having its far edge accurately positioned by means of the stop bar 18, is received between the upper face of the bands 11, 11a and 11b, and the outer periphery 4 of the cylindrical mold. The backing of the printing plate being positioned on the upper side of the printing plate is contoured to the arc of curvature of the cylindrical core 4. The printing surface of the plate which is on the lower side receives a contour conforming to the curvature of the flexible bands as they are drawn around the mold.

After the printing plate is secured between the outer surface of the cylindrical core and the flexible band, the cylindrical core is moved to the position indicated by the ten-inch cylindrical core 17 illustrated at the left in the figures. In this position the printing plate and core cools down, and as soon as the printing plate has solidified, the flexible bands are elevated from contact with the cylinder and the curved printing plate removed for the final machine operation prior to use on a printing cylinder.

It will be observed that with cylindrical molds of different diameters, the same flexible bands which are ordinarily of thin sheet spring steel, and the same rack and gear drive mechanism may be employed for curving plates to different arcs of curvature.

Printing plates curved in accordance with my invention will be found to have the same spacing between the printing lines or pictorial representations on the printing surface of the plates as existed when the plates were in the flat prior to curving.

Having thus described my invention, what I claim as new and desire to secure by Letters Patent is:

1. In a machine for curving printing plates, the combination of a cylindrical mold about which a printing plate is adapted to be curved, a plurality of flexible bands, means for securing end edges of each of said flexible bands laterally across said cylindrical mold, means for tensioning said flexible bands, and means for securing accurate holding of an end edge of a printing plate to be curved, between said flexible bands and the periphery of said cylindrical mold wherein-between said printing plate is adapted to be curved.

2. In a machine for curving printing plates, the combination of a cylindrical mold about which a printing plate is adapted to be curved, a plurality of flexible bands, means for securing end edges of each of said flexible bands laterally across said cylindrical mold, means for tensioning said flexible bands, and means for securing accurate holding of an end edge of a printing plate to be curved, between said flexible bands and the periphery of said cylindrical mold whereinbetween said printing plate is adapted to be curved, said means for accurately holding the end edge comprising a stop bar, the mounting of which is associated with said means for tensioning said flexible bands.

3. In a machine for curving printing plates wherein a plate to be curved is received between the peripheral surface of a cylindrical mold and a flexible support secured to the mold and which encircles the mold, means for holding an edge of a plate to be curved during the curving operation, said means comprising a stop bar extending parallel with the axis of the cylindrical mold.

4. In a machine for curving printing plates wherein a plate to be curved is received between the peripheral surface of a cylindrical mold and a flexible support secured to the mold and which encircles the mold, means for holding an edge of a plate to be curved during the curving operation, said means comprising a stop bar extending parallel with the axis of the cylindrical mold, said stop bar being operatively connected to said flexible support.

5. In a machine for curving printing plates wherein a plate to be curved is received between the peripheral surface of a cylindrical mold and a flexible support secured to the mold and which encircles the mold, means for holding an edge of a plate to be curved during the curving operation, said flexible support comprising a plurality of spring metal bands.

6. A machine for curving printing plates comprising a cylindrical mold, flexible supporting means secured to the mold and provided with a support on which non-secured portions of said flexible supporting means may be extended flatwise for receiving a flat printing plate to be curved, and means for holding said flat printing plate on the flatwise portion of said flexible support during movement of said cylindrical mold to curve said plate, said flexible support comprising a plurality of spring steel metal bands.

7. A machine for curving printing plates comprising a cylindrical mold, flexible supporting means secured to the mold and provided with a support on which non-secured portions of said flexible supporting means may be extended flatwise for receiving a flat printing plate to be curved, and means for holding said flat printing plate on the flatwise portion of said flexible support during movement of said cylindrical mold to curve said plate, said flexible support comprising a plurality of spring steel metal bands, and means for tensioning said metal bands.

8. A machine for curving printing plates comprising a cylindrical mold, flexible supporting means secured to the mold and provided with a support on which non-secured portions of said flexible supporting means may be extended flatwise for receiving a flat printing plate to be curved, and means for holding said flat printing plate on the flatwise portion of said flexible support during movement of said cylindrical mold to curve said plate, said flexible support comprising a plurality of spring steel metal bands, and means for tensioning said metal bands, said means effective on said bands independently.

9. A machine for curving printing plates comprising a cylindrical mold, flexible supporting means secured to the mold and provided with a support on which non-secured portions of said flexible supporting means may be extended flatwise for receiving a flat printing plate to be curved, and means for holding said flat printing plate on the flatwise portion of said flexible support during movement of said cylindrical mold to curve said plate, said means for holding a printing plate comprising a stop bar mounted on flexible bands which when extended flatwise, are resistant to pressure against said stop bar.

ALBERT B. SCHLATTNER.